United States Patent [19]

Baughman et al.

[11] 4,438,183

[45] Mar. 20, 1984

[54] PHOTOELECTROCHEMICAL CELL HAVING PHOTOANODE WITH THIN BORON PHOSPHIDE COATING AS A CORROSION RESISTANT LAYER

[75] Inventors: Richard J. Baughman; David S. Ginley, both of Albuquerque, N. Mex.

[73] Assignee: The United States of America as represented by the United States Department of Energy, Washington, D.C.

[21] Appl. No.: 411,396

[22] Filed: Aug. 25, 1982

[51] Int. Cl.³ ............................................. H01M 6/36
[52] U.S. Cl. .................................. 429/111; 204/290 R
[58] Field of Search .................... 429/111; 204/290 R; 428/620, 627, 427, 457, 538; 423/289

[56] References Cited

U.S. PATENT DOCUMENTS

| | | | |
|---|---|---|---|
| 2,677,714 | 5/1954 | Auwärter | 136/256 |
| 2,677,715 | 5/1954 | Auwärter | 136/256 |
| 2,966,424 | 12/1960 | Ruehrwein et al. | 423/289 |
| 4,268,711 | 5/1981 | Gurev | 136/256 |

FOREIGN PATENT DOCUMENTS

| | | | |
|---|---|---|---|
| 52-36990 | 3/1977 | Japan | 136/261 |
| 2023177 | 12/1979 | United Kingdom | 204/290 R |

OTHER PUBLICATIONS

K. Shohno et al., "Crystal Growth of Boron Monophosphide Using A $B_2H_6-PH_3-H_2$ System", *J. Crystal Growth*, vol. 45, pp. 187-191, (1978).

*Primary Examiner*—Aaron Weisstuch
*Attorney, Agent, or Firm*—Armand McMillan; Albert Sopp; Michael F. Esposito

[57] ABSTRACT

A surface prone to corrosion in corrosive environments is rendered anticorrosive by CVD growing a thin continuous film, e.g., having no detectable pinholes, thereon, of boron phosphide. In one embodiment, the film is semiconductive. In another aspect, the invention is an improved photoanode, and/or photoelectrochemical cell with a photoanode having a thin film of boron phosphide thereon rendering it anitcorrosive, and providing it with unexpectedly improved photoresponsive properties.

8 Claims, 1 Drawing Figure

EXTENDED AGING n-BP/n-Si vs n-Si
.1M $K_3Fe(CN)_6$ / .25M $K_4FE(CN)_6$

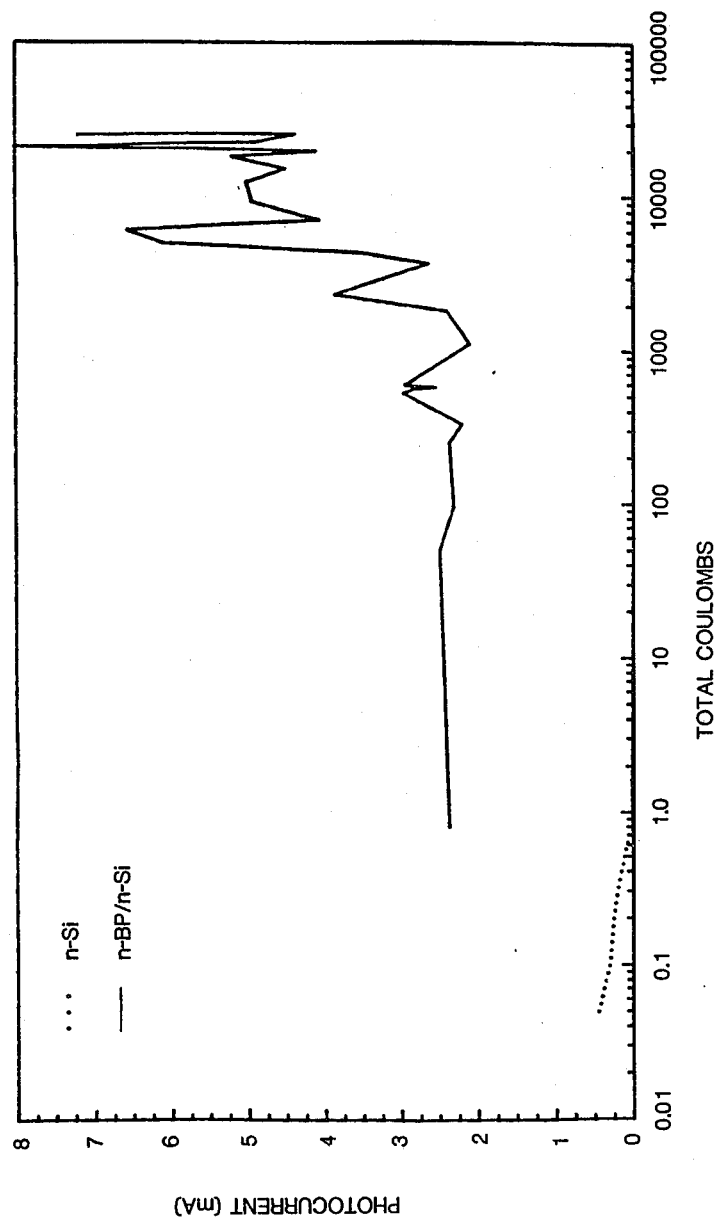

PHOTOELECTROCHEMICAL CELL HAVING PHOTOANODE WITH THIN BORON PHOSPHIDE COATING AS A CORROSION RESISTANT LAYER

The U.S. Government has rights in this invention pursuant to Contract No. DE-AC04-76DP00789 between the U.S. Department of Energy and Western Electric Company.

BACKGROUND OF THE INVENTION

This invention relates to a method of rendering a surface anticorrosive by depositing a thin layer of boron phosphide thereon. It is also directed to a method of rendering specifically, a semiconductive layer anticorrosive. This invention also relates to the use of a CVD (chemical vapor deposition) grown film of boron phosphide on a photoanode, e.g., an n-Si photoanode, of a photoelectrochemical cell as a stable photoelectrode layer and corrosion resistant protecting film for said photoanode.

It is known from the article "Crystal Growth of Boron Monophosphide Using a $B_2H_6$-$PH_3$-$H_2$ System" by Shohno, Ohtake, and Bloem in *Journal of Crystal Growth*, Vol. 45, pp 187–191 (1978), to epitaxially grow BP layers on Si wafers in the thermal reaction of a $B_2H_6$-$PH_3$ mixture in hydrogen. More specifically, the BP layer is grown in a horizontal CVD system for use as a conductive layer grown on a silicon substrate. Moreover, the article discusses the growth of either n-type BP or p-type BP for determination of the electrical properties of the BP layer. However, there is no explanation of how the parameters of the process can be varied to modify the grown film to obtain specifically desired electrical properties.

U.S. Pat. No. 2,677,714 to Auwärter discloses an optical-electrical conversion device comprising a light-permeable metal electrode. The metal layer is composed of a member of the group consisting of gold, silver, copper and copper alloy, and has a cover layer composed of a member of the group consisting of silicon and metal oxides, metal sulfides, metal fluorides, and metal phosphides. However, there is no discussion in said patent of the use of boron phosphide as both an electrode material and as an anticorrosive layer on the n-type anode of a photoelectrochemical cell such as a solar converter.

U.S. Pat. No. 4,268,711 to Gurev is of interest merely for the disclosure of a method of forming a solar cell cover in an approved apparatus. However, the patent merely discloses the forming of a mixed oxide and/or nitride solid coating on the surface of an article for physically protecting the surface of a solar cell.

U.S. Pat. No. 2,677,715 to Auwärter discloses an optical-electrical conversion device comprising a light-permeable metal electrode, such as gold, silver, copper, etc. There is an incidental disclosure of the use of phosphides as a dielectric.

There is no suggestion in any of the references that BP is useful as a corrosion resistant coating, and especially for a photoelectrode, i.e., a photoanode of photoelectrochemical cells. These references also fail to appreciate that BP can be used to render other surfaces, prone to corrosion, anticorrosive. More specifically, these references fail to show or suggest the use of BP in semiconductor device surface application, and particularly those exposed to corrosive aqueous environments.

OBJECTS OF THE INVENTION

It is thus an object of the present invention to provide methods for rendering surfaces anti-corrosive, particularly semiconductor surfaces, by CVD growing a film of boron phosphide as an anticorrosive coating thereon.

It is another object of the invention to provide an improved stabilized photoanode for use in photoelectrochemical cells having a boron phosphide film thereon.

Another object is to provide a photoelectrode for use in a variety of applications having a film of boron phosphide thereon for rendering it corrosion resistant, and providing improved photoresponse characteristics thereto.

SUMMARY OF THE INVENTION

In accordance with the invention, there is provided a method of rendering a surface anticorrosive by depositing a layer of boron phosphide on the surface; as well, the resultant surfaces are provided. More particularly, the surface is of the type exposed regularly to corrosive environments, e.g., aqueous environments. In one aspect, the surface is a semiconductive layer.

There is also provided an improved structure of the type used in a plurality of different photoresponsive structures, such as electrodes for electrochemical cells, solar materials used in thermal and photovoltaic devices, and a wide range of applications in chemical processing systems. These structures are rendered anticorrosive by having a boron phosphide layer deposited thereon. In a more specific aspect, the invention comprises an improved photoanode employed in a photoelectrochemical cell device and to an improved photoelectrochemical cell having a thin layer of boron phosphide CVD grown on the photoanode providing the photoanode with anticorrosive properties, and an unexpected improvement in photoresponse, i.e., its electrical properties.

BRIEF DESCRIPTION OF THE DRAWING

FIG. 1 is a graph of one embodiment showing extended aging on a log scale, illustrating the improved photoresponse of a photoanode of a photoelectrochemical cell in accordance with the invention.

DETAILED DISCUSSION OF THE INVENTION

The potential of photoelectrochemical cells as solar converters has up to now not been realized completely because of the difficulty in obtaining stable photoresponsive semiconductors of an appropriate bandgap. The need for stable photoresponsive semiconductor materials is a problem not unique to the photoelectrochemical area inasmuch as extended resistance to corrosion is a prerequisite for all electrodes employed in electrochemical cells, solar materials used in thermal and photovoltaic devices, and a wide range of applications in chemical processing systems.

In accordance with one aspect of the invention, a boron phosphide, i.e., BP, layer is provided on an photoanode, more particularly, an n-type Si photoanode, as an anticorrosive coating. n-type Si is a particularly desirable material for use as a photoanode but, up to now was an unstable photoanode because it is extremely prone to oxidation in the dark, and when illuminated, rapidly formed an $SiO_2$ insulating layer which terminated all photoresponse.

To provide protection against these corrosive effects, in accordance with the invention, a BP layer is epitaxially grown, for example, by CVD on, e.g., an n-Si substrate. Typically, when CVD growth is used, the process is conducted in a vertical growth apparatus of the type having an RF (radio frequency) induction coil for heating, and wherein epitaxial growth is achieved. These devices are well known to those skilled in the art and the specific configuration employed is not critical. It is only essential that the device be of the type used for achieving CVD of a film on a substrate supported therein.

A particularly preferred device employed in the process of the invention is a vertical growth apparatus of the type wherein an atmospheric chamber contains a graphite susceptor therein for supporting substrate materials thereon. To ensure that the temperature in the chamber, and specifically at the substrate is maintained constant, a monitoring thermocouple is embedded in the graphite susceptor directly beneath the region, i.e., top portion, whereon the substrate materials are supported. The entire assembly is mounted on, sealed and supported on a base support having a gas outlet communicating with the bottom of the atmosphere chamber for withdrawing gases therefrom. A gas inlet is located directly above the substrate materials for passing reactant gases thereonto. An RF induction coil is arranged outside and around the chamber at the level of the graphite susceptor and substrate materials to provide the necessary heating.

In accordance with one process, a virgin HF-etched n-Si photoanode is supported on the graphite susceptor. The process is preferably conducted in much the same manner as in related patent application Ser. No. 416,409, filed on Sept. 9, 1982 and of the same inventors, which discloses a method of preparing a free-standing crystal and boron phosphide film, and whose disclosure is specifically incorporated by reference herein. The only difference is the substrate employed and variations in deposition temperatures for boron phosphide is to account for the different materials employed. Depending on the gas flow rate, temperatures will vary from about 800° C. to 1050° C., preferably 850°–950° C. Likewise, reactant gas flow rates will also vary from typically, 10 cc/min to 120 cc/min for 1 mole % $B_2H_6$ in $H_2$ carrier gas, and from 40 cc/min to 120 cc/min for 5 mole % $PH_3$ in $H_2$ carrier gas. In the growth process, the hydrogen carrier gas flow rate is adjusted such that the total gas flow rate of all reactant gases and carrier gas is about 2500 cc/min. The selection of this value is conventional, and by maintaining the total flow rate at this value, the desired properties of the BP layer can be varied by varying the other parameters of the deposition process in a conventional manner.

Testing of a BP protected n-type silicon photoanode showed unexpected improvement in the ability of the photoanode to pass charge. More particularly, test results on a corrosion protected photoanode showed that it passes significantly more electrical charge than does an equivalent unprotected photoanode.

The BP film can also be grown on any kind of surface for corrosion protection purposes, so long as the BP adheres well to the surface. The film of BP is grown by CVD or a modification thereof. Typically, the surface is thin and continuous, i.e., on the order of about 2000 Å to 5000 Å. The nature of protection is against various kinds of corrosion, e.g., oxidation, photocorrosion, electrocorrosion, etc.

Without further elaboration, it is believed that one skilled in the art can, using the preceding description, utilize the present invention to its fullest extent. The following specific embodiment is, therefore, to be construed as merely illustrative and not limitative of the remainder of the disclosure in any way whatsoever. In the following example, all temperatures are set forth uncorrected in degrees celsius; unless otherwise, indicated all parts and percentages are by weight.

EXAMPLE

A virgin n-type silicon photoanode was tested in comparison with the BP protected n-type silicon photoanode, having a thin deposited BP coating having no detectable pinholes, used in a 0.1 M $K_3Fe(CN)_6$/0.25 M $K_4Fe(CN)_6$ aqueous electrolyte.

The compared results are shown in FIG. 1, which shows the extended aging comparison, on a log scale between an uncoated photoanode and that of the invention. More particularly, it is illustrated that the BP protected device passed a total of 26,500 coulombs of electrical charge, representing greater than 33,000 times the charge that could pass through an unprotected electrode. At the conclusion of the test, the photocurrent through this electrode was increasing, the reasons for the increase not being understood, although fluctuations are attributed to replacement of spent electrolyte with fresh electrolyte and periodic cleaning of container surfaces. This electrode exhibited considerable stability when exposed to high light intensities (3 suns or greater) at broad band irradiation, and appreciable electrode currents (10–20 mA/cm$^2$).

The preceding example can be repeated with similar success by substituting the generically or specifically described reactants and/or operating conditions of this invention for those used in the preceding examples.

As to the type of photoelectrochemical cell employed in this device, it is conventional in nature and well known to those skilled in the art, and generally comprising a metallic backing which makes up the cathode, which is platinum or graphite in a preferred form, with the anode material preferably n-Si having the coating thereon and mounted on this backing. The BP/silicon layer is the anode, and the electrolyte, in this specific instance, the $K_3Fe(CN)_6$-$K_4Fe(CN)_6$ is in solution in water in a beaker containing the herebefore described metallic backing/silicon-BP layer arrangement.

It is only necessary that the BP layer be made as thick so as to not have any detectable pinholes. Relatively speaking, it is preferred that the silicon layer be thick relative to a thin coating of BP, and the BP layer thickness will preferably range from about 2,000 Å to 5,000 Å. The thickness of the Si layer is conventional, and for these applications will normally be 100–1000 microns, typically 300 microns.

In addition to growing a BP film on an n-Si photoanode, the process has been employed on gallium arsenide electrodes, as well as gallium phosphide. These devices exhibited anticorrosive properties with similar improved electrical characteristics as well. Not only were photoelectrodes of these materials improved, but the thin film of BP was also deposited to render other types semiconductor devices of these materials anticorrosive.

Testing was also conducted on non-semiconductive materials, and it was found that film of BP could be grown according to the process, with slight modifications in the CVD conventional in nature, on metal wafers, i.e., steel, as well as ceramics, quartz, and sapphire. All of these materials are prone to extensive corrosion in corrosive environments (strong acid or base) such as aqueous environments, and all exhibited unexpected resistance to corrosion when a thin BP film was grown thereon.

Applications of this process encompass CVD growing a thin BP film on a metal, i.e., steel, tank to be used underwater. The CVD can be conducted in a larger growth device to accommodate the tank necessary modifications thereto being conventional in nature.

The preceding examples can be repeated with similar success by substituting the generically or specifically described reactants and/or operating conditions of this invention for those used in the preceding examples. From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a photoelectrochemical cell device comprising a photoanode, the improvement comprising a film of boron phosphide on said photoanode as a stable photoelectrode layer and as a corrosion resistant protecting film for said photoanode, whereby the surface of said photoanode is rendered resistant to electrocorrosion and photocorrosion and thereby stabilized and simultaneously provided with photoresponse properties.

2. A device according to claim 1, wherein said photoanode comprises silicon.

3. A device according to claim 1, wherein said photoanode comprises gallium arsenide.

4. A device according to claim 1, wherein said photoanode comprises gallium phosphide.

5. A device according to claim 1, wherein said boron phosphide film is at least sufficiently thick to have no detectable pinholes therein.

6. A device according to claim 5, wherein said boron phosphide film is about 2000 Å to 5000 Å thick.

7. A device according to claim 1 wherein said boron phosphide film is CVD grown.

8. A device according to claim 1 wherein said photoanode is n-Si.

* * * * *